(12) United States Patent
Shearer

(10) Patent No.: US 10,944,586 B2
(45) Date of Patent: Mar. 9, 2021

(54) SYSTEMS AND METHODS FOR HOME AUTOMATION MONITORING

(71) Applicant: Vivint, Inc., Provo, UT (US)

(72) Inventor: Wade Shearer, Lehi, UT (US)

(73) Assignee: Vivint, Inc., Provo, UT (US)

( * ) Notice: Subject to any disclaimer, the term of this patent is extended or adjusted under 35 U.S.C. 154(b) by 351 days.

(21) Appl. No.: 14/481,512

(22) Filed: Sep. 9, 2014

(65) Prior Publication Data

US 2015/0074582 A1 Mar. 12, 2015

Related U.S. Application Data

(60) Provisional application No. 61/876,089, filed on Sep. 10, 2013.

(51) Int. Cl.
| | | |
|---|---|---|
| *G06F 3/0481* | (2013.01) | |
| *G06F 3/0482* | (2013.01) | |
| *G06F 3/0488* | (2013.01) | |
| *H04L 12/28* | (2006.01) | |
| *H02J 13/00* | (2006.01) | |

(Continued)

(52) U.S. Cl.
CPC .......... *H04L 12/282* (2013.01); *G06F 3/0481* (2013.01); *H02J 13/00001* (2020.01); *G05B 15/02* (2013.01); *G05B 2219/2642* (2013.01); *G06F 3/0482* (2013.01); *G06F 3/04817* (2013.01); *G06F 3/04886* (2013.01); *G08B 25/008* (2013.01); *H04L 12/2803* (2013.01); *Y02B 70/30* (2013.01); *Y04S 20/20* (2013.01); *Y04S 20/221* (2013.01)

(58) Field of Classification Search
CPC ............ G05B 15/02; G05B 2219/2642; G06F 3/0481; G06F 3/04817; G06F 3/0482; G06F 3/04886; H04L 12/282; H04L 12/2803; H02J 13/00001
See application file for complete search history.

(56) References Cited

U.S. PATENT DOCUMENTS

| | | | |
|---|---|---|---|
| 8,375,118 B2* | 2/2013 | Hao | G05B 15/02 |
| | | | 709/223 |
| 9,071,453 B2* | 6/2015 | Shoemaker | H04L 67/125 |
| 9,354,774 B2* | 5/2016 | Mairs | G06F 3/04817 |

(Continued)

*Primary Examiner* — Ting Z Lee
(74) *Attorney, Agent, or Firm* — Holland & Hart, LLP

(57) ABSTRACT

Methods, systems, and devices are described for an improved graphical user interfaces suitable for monitoring home automation, security, and/or energy management systems. In some embodiments, the graphical user interface may include a summary list of device states, including a security device state. In some embodiments, one or more configurable lists of context-associated state types may be provided. The summary list of device states may include, for example, one or more device state list items associated with a detected context. In some instances, the system may include configuration of meta-devices. Meta-devices may include a combination of multiple devices, multiple meta-devices, or both. In some embodiments, meta-devices may be associated with one or more sensors, feature controllers, and/or security systems. A meta-device may indicate any type of relationship between sensor and/or feature controllers such as, for example, a property feature, a physical location, and/or an area associated with a property.

21 Claims, 13 Drawing Sheets

(51) Int. Cl.
*G05B 15/02* (2006.01)
*G08B 25/00* (2006.01)

(56) References Cited

U.S. PATENT DOCUMENTS

| | | | | |
|---|---|---|---|---|
| 2006/0017558 A1* | 1/2006 | Albert | ............... | A61B 7/003 |
| | | | | 340/531 |
| 2007/0180463 A1* | 8/2007 | Jarman | ............... | H04H 60/31 |
| | | | | 725/28 |
| 2007/0220907 A1* | 9/2007 | Ehlers | ............... | F25B 49/005 |
| | | | | 62/126 |
| 2010/0281312 A1* | 11/2010 | Cohn | ............... | G08B 29/02 |
| | | | | 714/49 |
| 2010/0283579 A1* | 11/2010 | Kraus | ............... | G07C 9/00944 |
| | | | | 340/5.7 |
| 2013/0346511 A1* | 12/2013 | Park | ............... | G06Q 10/10 |
| | | | | 709/206 |
| 2014/0266791 A1* | 9/2014 | Lloyd | ............... | H04Q 9/00 |
| | | | | 340/870.09 |
| 2014/0306833 A1* | 10/2014 | Ricci | ............... | B60Q 1/00 |
| | | | | 340/901 |
| 2014/0309788 A1* | 10/2014 | Blum | ............... | G01S 19/51 |
| | | | | 700/276 |

* cited by examiner

SYSTEMS AND METHODS FOR HOME AUTOMATION MONITORING

CROSS REFERENCE

This application claims priority from U.S. Provisional Patent Application No. 61/876,089 entitled "SYSTEMS AND METHODS FOR HOME AUTOMATION MONITORING," which was filed 10 Sep. 2013.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor an aspect of a home or business. System-level summary and meta-device information related to an installed system may not be readily available.

SUMMARY

Methods and systems are described for providing a graphical user interface suitable for viewing and modifying home automation, home security, and energy management devices. In some embodiments, the graphical user interface may include a summary list of device states, system states, or both. In some instances, the contents of the list may be configurable. The list of device states may include, for example, one or more device state list items associated with a detected context. In some implementations, the summary list of device states may include a device type status reporting the state of all devices of a particular type. The device type status may include warning information, non-warning information, or both. Further, the user interface may prevent display and/or enablement of functions incompatible with a detected context.

In some instances, the system may support the configuration of meta-devices. Meta-devices may include a combination of multiple devices, multiple meta-devices, or both. In some embodiments, meta-devices may be associated with one or more sensors, feature controllers, and/or security systems. A meta-device may indicate any type of relationship between sensor and/or feature controllers such as, for example, a property feature, a physical location, and/or an area associated with a property.

In certain embodiments, editable parameter views and function of interest views for a property feature may be navigationally close to views including inactive device state data. In some embodiments, the transition from an inactive view to an active view is a visual simulation of a card flip, with an interactive view of a device appearing on the view corresponding to the back of a device card. In some implementations, each device and/or meta-device may be represented as an individual card with one or more primary device controls and summary activity information displayed on the view corresponding to the front of the card, and advanced controls and configuration information displayed on the view corresponding to the back of the card.

In some embodiments, the home automation graphical user interface may include a list of items containing at least one item associated with a property device state, one item associated with a security device state, and one item indicative of a non-warning status. In certain implementations, this list of items may be based, at least in part, on a configurable list of context associated state types. One or more items may be included in the list based, at least in part, on the current application context. In certain instances, the graphical user interface may also include an energy monitoring device state, a device type status, a current device state, a current meta-device state, and/or a most recent device event for one or more devices. In certain implementations, one or more list items may be interactive. In some implementations, the graphical user interface is produced on a portable electronic computing device having a touch screen display.

In some embodiments, the home automation graphical user interface may include a device view containing a device identifier, multiple associated device states, and multiple sensor statuses associated with different sensors. In some implementations, the device identifier may be a physical location, a physical area associated with a property, a property feature. In cases where the device identifier is a property feature, one or more sensor statuses may be associated with one or more property features other than the property feature associated with the device identifier. In certain instances, the graphical user interface is produced on a portable electronic computing device having a touch screen display.

In some embodiments, the home automation graphical user interface may include a device and/or meta-device interface with multiple views for one or more devices and/or meta-devices. In certain implementations, a first device or meta-device view including at least one non-interactive device status item and a toggle control may transition to a second device or a meta-device view different from the first view. This second device or meta-device view may include at least one interactive device setting and a toggle control. The toggle control, when selected, may cause the second view to transition back to the first view. In some instances, the device view may be a meta-device view associated with a physical location. In certain implementations, the graphical user interface is produced on a portable electronic computing device having a touch screen display.

Some embodiments include a method displaying items associated with one or more device states. Current context may be determined, and a pre-defined list of context-associated state types may be retrieved based, at least in part, on the current context. The method may include retrieving device state data, system state data, or both from one or more sensors, feature controllers and/or service provider devices. If the method determines that one or more of the device states or system states corresponds to a context-associated state type in the pre-defined list, a list of items may be generated and displayed based, at least in part, on the results of that determination.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
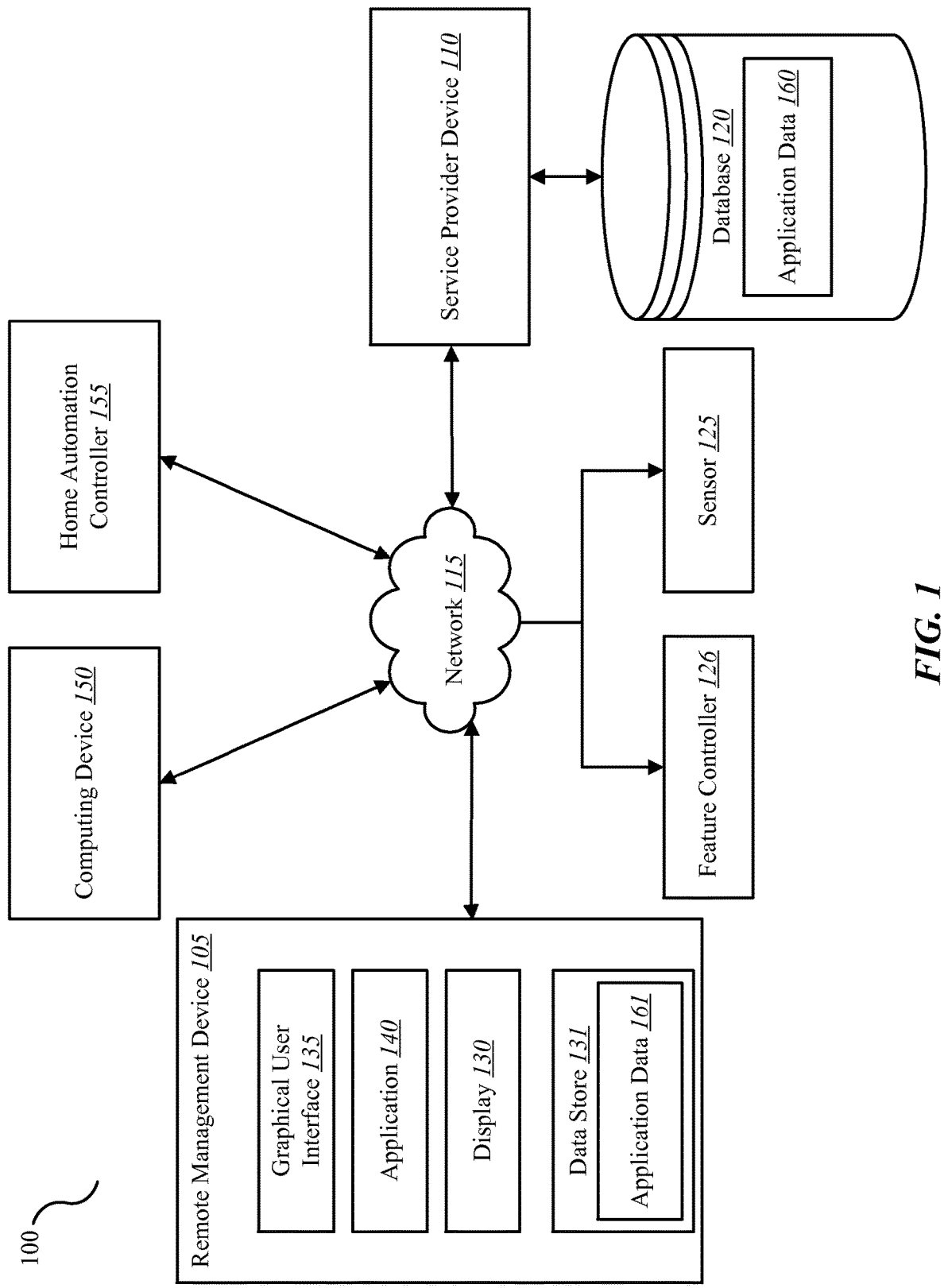
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security. More specifically, the systems and methods described herein relate to an improved graphical user interface for integrated monitoring and managing of home automation systems and home security systems.

FIG. 1 is a block diagram illustrating one embodiment of an environment 100 in which the present systems and methods may be implemented. In some embodiments, the systems and methods described herein may be performed on a device (e.g., remote management device 105). The environment 100 may include a remote management device 105, a service provider device 110, a sensor 125, a feature controller 126, a display 130, a computing device 150, a home automation controller 155, and/or a network 115 that allows the remote management device 105, service provider device 110, computing device 150, home automation controller 155, sensor 125, and feature controller 126 to communicate with one another. Examples of remote management device 105 include control panels, indicator panels, multi-site dashboards, mobile devices, smart phones, personal computing devices, computers, servers, etc. . . . Examples of the home automation controller 155 include a dedicated home automation computing device (e.g., wall-mounted controller), a personal computing device (e.g., laptop, desktop, etc.), a mobile computing device (e.g., tablet computing device, smartphone, etc.), and the like.

In some embodiments, the remote management device 105 is a portable electronic device with a touch screen display. In some embodiments the width of the portable electronic device may range from about 60 mm to 195 mm, the height may range from about 110 mm to 275 mm, and/or the weight may range from about 100 g to 2000 g.

In some embodiments, remote management device 105 may be integrated with home automation controller 155 in the form of one or more personal computing devices (e.g., mobile devices, smart phones, and/or personal computing devices) to both control aspects of a property as well as to receive and display notifications regarding monitored activity of a property. Examples of sensor 125 include a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, movement sensor, voice sensor, and the like.

Sensor 125 may represent one or more separate sensors or a combination of two or more sensors in a single sensor device. For example, sensor 125 may represent one or more camera sensors and one or more motion sensors connected to environment 100. Additionally, or alternatively, sensor 125 may represent a combination sensor such as both a camera sensor and a motion sensor integrated in the same sensor device. Although sensor 125 is depicted as connecting to remote management device 105 over network 115, in some embodiments, sensor 125 may connect directly to remote management device 105. Additionally, or alternatively, sensor 125 may be integrated with a home appliance or fixture such as a light bulb fixture. Sensor 125 may include an accelerometer to enable sensor 125 to detect a movement. Sensor 125 may include a wireless communication device enabling sensor 125 to send and receive data and/or information to and from one or more devices in environment 100. Additionally, or alternatively, sensor 125 may include a GPS sensor to enable sensor 125 to track a location of sensor 125. Sensor 125 may include a proximity sensor to enable sensor 125 to detect proximity of a person relative to a predetermined distance from a dwelling (i.e., geo-fencing). Sensor 125 may include one or more security detection sensors such as, for example, a glass break sensor, a motion detection sensor, or both. Additionally, or alternatively, sensor 125 may include a smoke detection sensor, a carbon monoxide sensor, or both.

Feature controller 126 may represent one or more separate feature controls or a combination of two or more feature controls in a single feature controller device. For example, feature controller 126 may represent one or more camera controls and one or more door lock controls connected to environment 100. Additionally, or alternatively, feature controller 126 may represent a combination feature controller such as both a camera control and a door lock control integrated in the same feature controller device. Although feature controller 126 is depicted as connecting to remote management device 105 over network 115, in some embodiments, feature controller 126 may connect directly to remote management device 105. Additionally, or alternatively, feature controller 126 may be integrated with a home appliance or fixture such as a light bulb fixture. Feature controller 126 may include a lighting control mechanism configured to control a lighting fixture. Feature controller 126 may include a wireless communication device enabling feature controller 126 to send and receive data and/or information to and from one or more devices in environment 100. Additionally, or alternatively, feature controller 126 may include an appliance control interface enabling feature controller 126 to send commands to an integrated appliance interface. Feature controller 126 may include an interface to a security system to monitor, activate, modify and/or arm one or more security features.

In some configurations, remote management device 105 may include components such as user interface 135, application 140, display 130, and data store 131. Although the components of remote management device 105 are depicted as being internal to remote management device 105, it is understood that one or more of the components may be external to the remote management device 105 and connect to remote management device 105 through wired and/or wireless connections. For example, one or more components (e.g., software, firmware, and/or hardware) of application 140 may be located, installed, and/or part of home automation controller 155, computing device 150, service provider device 110, sensor 125, feature controller 126, and/or database 120.

In some embodiments, computing device 150 may include a television set. Additionally, or alternatively, computing device 150 may include one or more processors, one or more memory devices, and/or a storage device. Examples of computing device 150 may include a viewing device associated with a media content set top box, satellite set top box, cable set top box, DVRs, personal video recorders (PVRs), and/or mobile computing devices, smart phones, personal computing devices, computers, servers, etc. Thus, application 140 may be installed on computing device 150 in order to allow a user to interface with a function of remote management device 105, home automation controller 155, and/or service provider device 110.

In some embodiments, remote management device 105 may communicate with service provider device 110 via network 115. Examples of networks 115 include cloud networks, local area networks (LAN), wide area networks (WAN), virtual private networks (VPN), wireless networks (using 802.11, for example), and/or cellular networks (using 3G and/or LTE, for example), etc. In some configurations, the network 115 may include the Internet. In some embodiments, a user may access the functions of remote management device 105 and/or home automation controller 155 from computing device 150. For example, in some embodiments, computing device 150 includes a mobile application that interfaces with one or more functions of remote management device 105, home automation controller 155, and/or service provider device 110.

In some embodiments, service provider device 110 may be coupled to database 120. Database 120 may include program content 160 associated with the monitored activities of a property. For example, remote management device 105 may access application data 160 in database 120 over network 115 via service provider device 110. Database 120 may be internal or external to the service provider device 110. In one example, remote management device 105 may include an integrated data store 131, being internal or external to device 105. Data store 131 may include application data 161 associated with the monitoring activities of a property. In some embodiments, application data 161 includes one or more replicated application data 160 items. In certain instances, one or more application data 161 items are synchronized with one or more application data 160 items.

Application 140 may allow a user to control (either directly or via home automation controller 155) an aspect of the monitored property, including security, energy management, locking or unlocking a door, checking the status of a door, locating a person or item, lighting, thermostat, cameras, receiving notification regarding a current status or anomaly associated with a home, office, place of business, and the like. In some configurations, application 140 may enable device 105 to interface with home automation controller 155 and provide a graphical user interface 135 to display home automation content on remote management device 105 and/or computing device 150. Thus, application 140, via the graphical user interface 135, may allow users to control aspects of their home and/or office.

Figure 2:
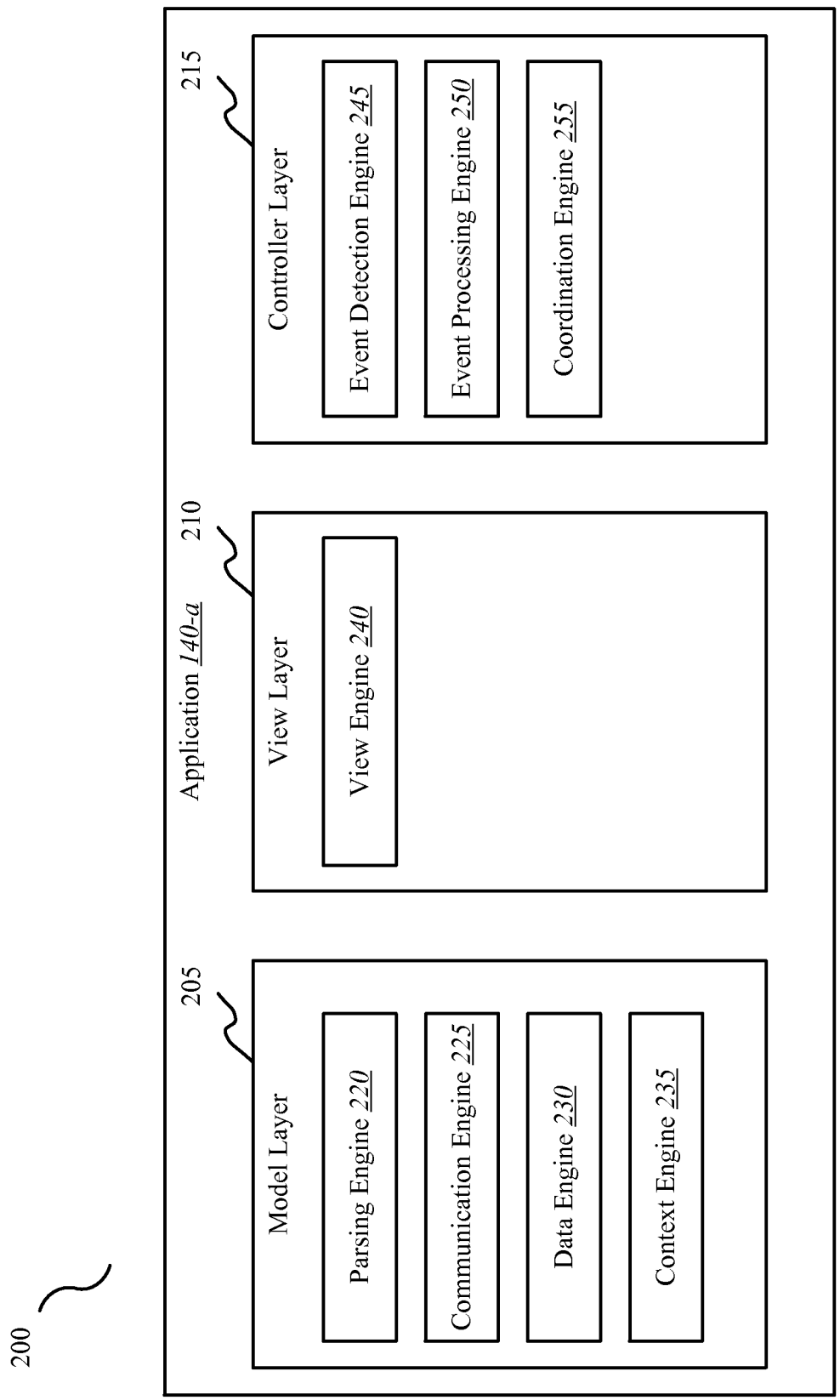
FIG. 2 is a block diagram of one example of an application layer architecture of the application of FIG. 1.

Referring now to FIG. 2, in some embodiments, application 140 may be implemented according to application layer architecture 140-a. Application 140-a may be one example of application 140 depicted in FIG. 1. Application 140-a may include a model layer 205, a view layer 210, and a controller layer 215. The model layer 205 may include a parsing engine 220, a communication engine 225, a data engine 230, and a context engine 235. The view layer 210 may include a view engine 240. The controller layer 215 may include an event detection engine 245, an event processing engine 250, and a coordination engine 255. These engines may be implemented as objects, modules, routines, services, distributed services, web services, or any other programming model capable of implementing the systems and methods described herein.

The communication engine 225 may be configured to communicate with other computing devices, including sending commands, sending data, and receiving data. Computing devices may include, for example, home automation controller 155, computing device 150, service provider device 110, sensor 125, feature controller 126, and/or other devices. In one example, communication engine 225 may send a request to a home automation controller 155 requesting home automation controller 155 to send device state data. In an alternate embodiment, the communication engine 225 may implement a listener service to receive broadcast data and/or streamed data. The communication engine 225 may pass data directly to other engines or services. In addition, or alternatively, the communication engine 225 may create data structures, such as, for example, by instantiating objects, queuing data structures for retrieval by other engines, notifying other engines of data structures of interest, and/or passing data structures directly to other engines. For example, the communication engine 225 may detect and receive a broadcast message from a service provider device 120 indicating that a glass break sensor has detected a glass break event. The communication engine 225 may instantiate a device state object that includes the received data relating to the event, and place the device state object in a queue for retrieval by the parsing engine 220.

Parsing engine 220 may be configured to process device state data received from sensor 125, feature controller 126, service provider device 110, home automation controller 155, database 120, and/or data store 131. In some embodiments, this data is received via communication engine 225, data engine 230, or both. For example, parsing engine 220 may request one or more meta-device configurations from data engine 230. In some implementations, a meta-device is a device object containing multiple device objects. For example, a door object could include an automated door lock feature controller object, a door sensor object, and a camera object. This meta-device object may be treated as a single device object by other engines. Data engine 230 may retrieve one or more meta-device configurations from data store 131 and provide data to parsing engine 220. Parsing engine 220 may further retrieve device state data from communication engine 225, and compare the retrieved device state data with the meta-device configurations. If the parsing engine detects the presence of a device that is part of a meta-device, the parsing engine may instantiate a meta-device object for use in further processing and or presentation, such as, for example, construction of a summary list. As a further example, the parsing engine may provide a summary list object to the coordination engine 255 for delivery to the view engine for population of a presentation view.

In certain instances, the parsing engine 220 may be configured to determine a device type state for one or more devices having a common type. A device type state determination may be based on assessing a set of similar devices. For example, communication engine 225 may receive device state data for a set of automated door lock feature controllers. The communication controller may queue this data for retrieval by parsing engine 220. Parsing engine 220 may retrieve the set of all door lock feature controller device state objects from a queue, then parse each object to determine whether all devices are in a locked state, an unlocked state, or a mixed state (i.e., where one or more devices are locked and one or more devices are unlocked). The parsing engine may then generate a device type state message indicating, for example, all doors are locked, or alternatively, one or more doors are unlocked. A device type state message and/or device type state may then be made available to other engines for inclusion in presentation views.

In some embodiments, a context engine determines application context, user context, or both. Application contexts may include, for example, a default context, a scene context, a person-of-interest context, and/or a functional context. User contexts may include, for example, a user location such as at a home and away from a home. One or more contexts may be used to control display of certain items, availability of certain functions, and/or execution of certain rules. In some implementations, a context configuration may be created identifying one or more device states of interest to be displayed in a summary list of device states when that context is detected by the context engine 235. The context configuration may be stored in a persistent data store integrated with the remote management device 105, or a remote data store such as, for example, database 120. For example, when a user context is detected indicating the user is away from the home, a device type status for the state of some or all door locks may be configured to be displayed in a summary list of device states. By contrast, when a user context is detected indicating the user is at home, a device type status for the state of some or all door locks may not be of interest and thus may not be included in the configuration for the at home context.

In certain instances, event detection engine 245 and event processing engine 250 recognize user interface events and initiate methods associated with those events. For example, when a save event is pressed after editing a context configuration, the event detection engine 245 detects the button press event and calls the event processing engine 250 to initiate the appropriate processing activities, such as directing the coordination engine 255 to pass information to the data engine 230 for persistent storage, and/or directing the view engine 240 to generate the appropriate presentation view according to the navigation path.

Figure 3:
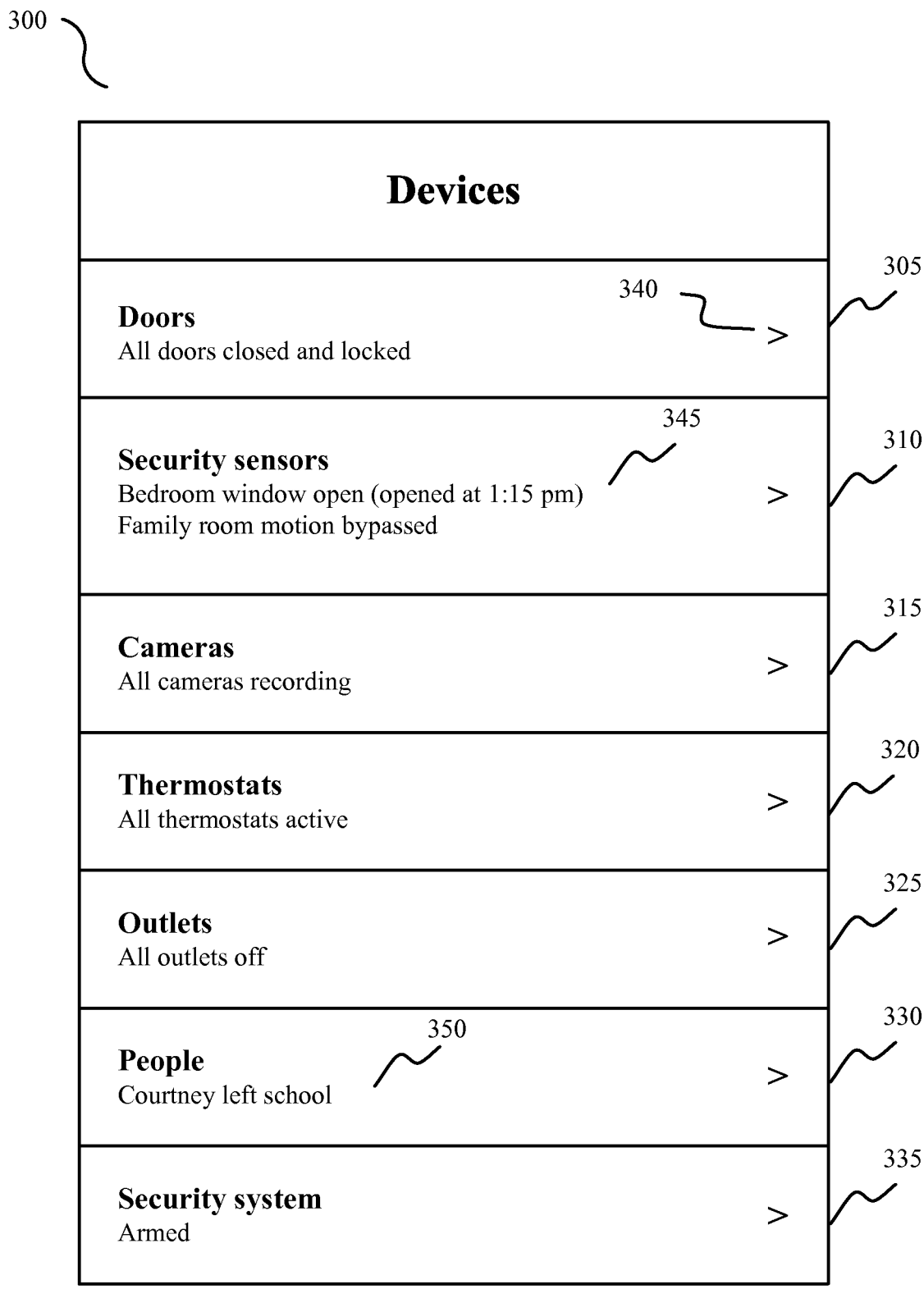
FIG. 3 is a block diagram of an exemplary user interface for a device states summary listing displayed on a remote management device of FIG. 1.

Referring now to FIG. 3, an exemplary user interface for displaying a summary list of device states 300 may be generated by the view engine 240. Each device state list item may be displayed as a static element or an active control, with active controls indicated, for example, by a graphical indicator such as an arrow 340. Detection of a selection event for an active control by the event detection engine 245 may result in the event processing engine 250 generating a view with information or functionality relating to the device state list item. Such information or functionality may include, for example, device configuration functions, detailed device information, and the like. Each device state list item may include a device designator and device state data. In addition to device states associated with a single discreet device, list item categories may include, for example, device type states 310, 315, 320, 325 and/or system states 335.

In some embodiments, device type state list items may include an indication of a consistent state of all devices of a particular type. For example, a device type state list item configured to indicate the status of all camera devices 315 might indicate when all cameras are recording. Similarly, a device type state list item configured to indicate the status of all security devices 310 might indicate specific device states of one or more devices in the set of security devices where such devices are not in an expected state. For example, if a security system is armed 335, a security sensors device type list item 310 may indicate when one or more window sensors report an open window and/or when one or more sensors have been bypassed. In some implementations, the last device event reported by a device is displayed 350 along with the time of the event 345. In other embodiments, where such devices are not in an expected state, the status indication may be a general indication rather than a specific device indication. For example, rather than indicate which doors are unlocked, the doors device type state list item may indicate generally that not all doors are locked. When the event detection engine 245 detects the selection of the doors device type list item control 305, the event processing engine 250 may initiate view presentation by the view engine 240 of an interactive view providing access to the automatic door locking feature control for one or more unlocked doors, bypassing preliminary reporting of specific unlocked doors.

Figure 4:
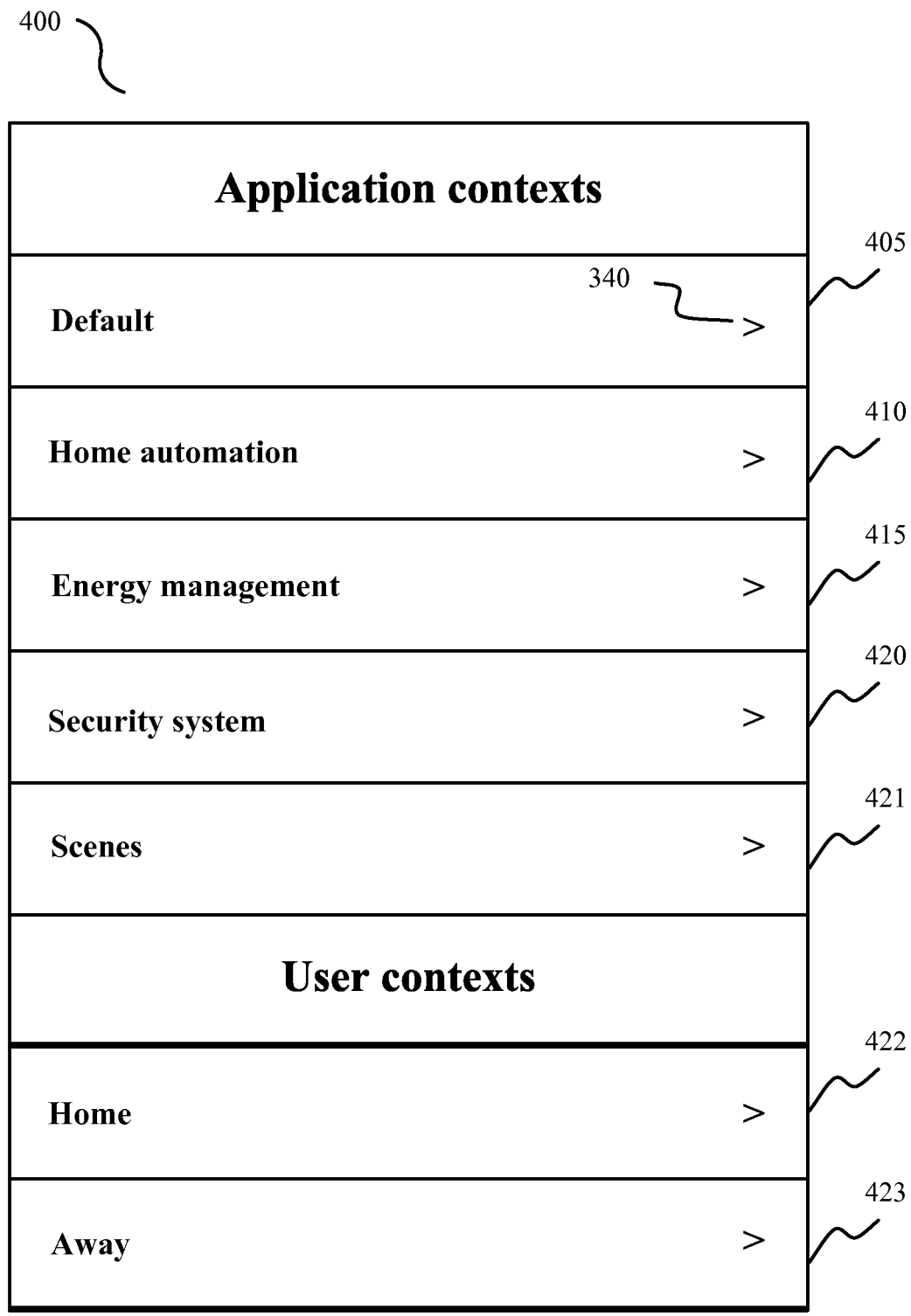
FIG. 4 is a block diagram of an exemplary user interface for a configurable context selections listing displayed on a remote management device of FIG. 1.

Referring now to FIG. 4, an exemplary user interface for displaying a list of contexts 400 may be generated by the view engine 240. Contexts are conditions that may be used to determine, in part, whether one or more device status list items appear in a summary view, whether functions are made available, whether warnings are displayed when functions are attempted, and the like. Context categories may include, for example, application contexts 405, 410, 415, 420, 421 and user contexts 422, 423. Application contexts may include system level contexts 405, 410, 415, 421 and scene contexts 421. In some embodiments, configurable contexts include a default configuration 405 which may define one or more application behaviors where no defined context is detected.

In some embodiments, contexts may be enabled, created, edited and/or configured to associate desired application behaviors with the detection of an associated context by the context engine 235. For example, a security system context configuration 420 may include a list of device states to be displayed in a summary list of device states when security system is in an armed state. In another example, a home automation context configuration 410 may include a configuration option to display a warning when a door locking function is attempted while a sensor 125 indicates a door is in an open state, or alternatively to disable door locking functionality during this detection condition by the context engine 235. A scene context may associate one or more application behaviors to the detection of an activated scene by the context engine 235. For example, the detection of a vacation scene may be associated with the inclusion of a security sensor device type state in the summary list of device states. In some embodiments, one or more context elements may not be configurable, but rather, programmatically determined at run time, hard-coded at compile time, and/or enabled according to installation rules at the time of system or device installation.

In some embodiments, application behaviors associated with user contexts 422 and/or 423 are configurable. Detection of the location of a user in relation to a property by, for example, an embedded GPS component may be obtained by the communication engine 225 and passed to the context engine 235. The context engine may compare the location coordinates of the user to the location coordinates of the property to determine the distance the user is from the property. If that determination results in a value that exceeds a threshold distance, then the user context may be set to away 423, resulting in the initiation of the application behaviors associated with the away context. For example, if user context is determined to be away 423, the door device state may be included in the summary list of device states. If the user context is home 422, the motion detector sensor device status may not be included in the summary list of device states.

In some embodiments, context configuration may be specific to a user. The context configuration may be stored in a persistent data store 131 on the remote management device 105, or in a remote data store such as, for example, a service provider database 120 or a data store on another system device such as home automation controller 155. The stored configuration may be associated with one or more user accounts and/or user credentials. In some embodiments, context configuration may be device specific, available only to users of the device where the context configuration is persistently stored.

Figure 5:
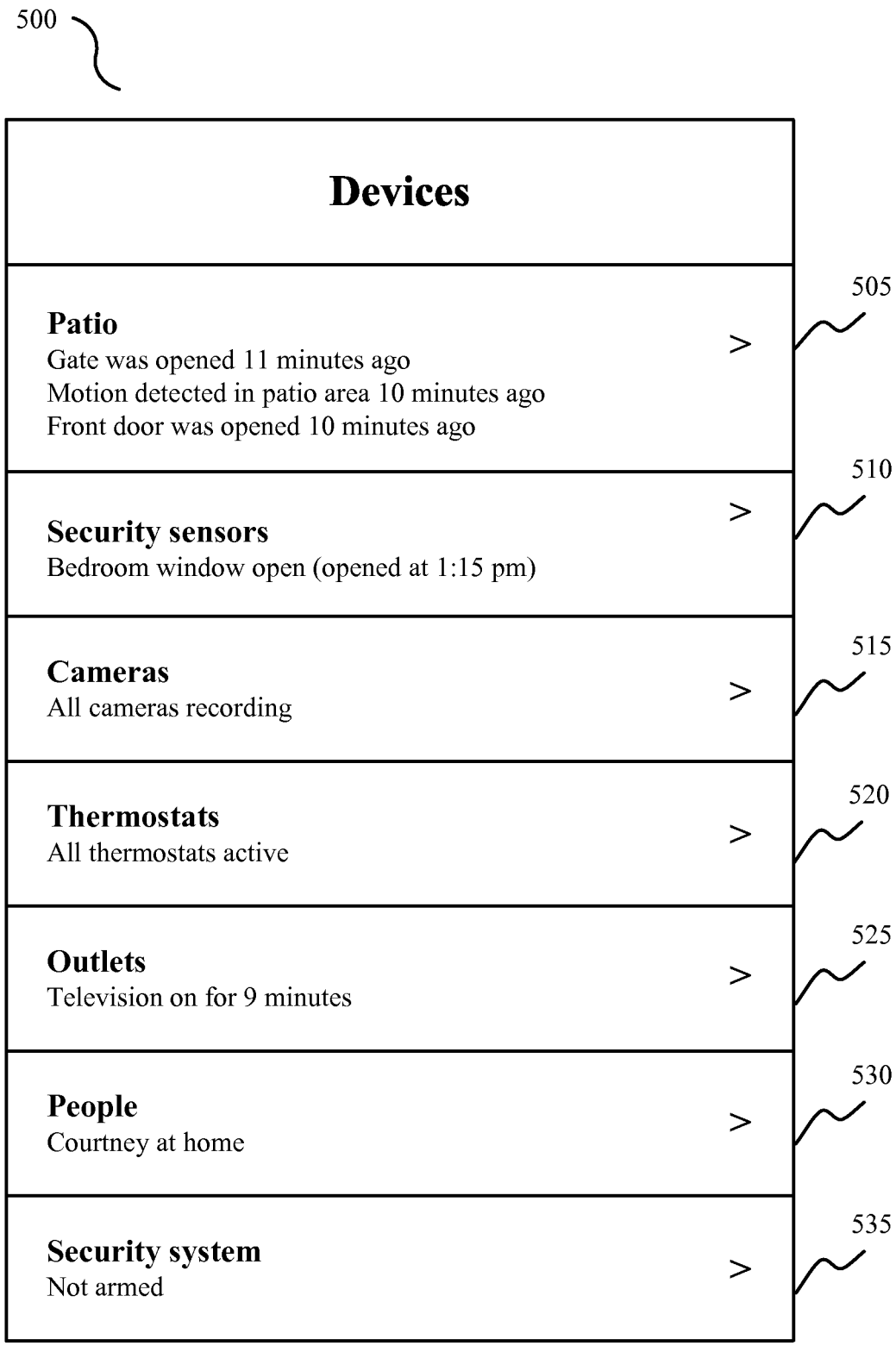
FIG. 5 is a block diagram of an exemplary user interface for a context-associated device states listing displayed on a remote management device of FIG. 1.

Referring now to FIG. 5, the view engine 240 may generate an exemplary user interface view displaying one or more context-associated list items in a summary list of device states 500. For example, a user context may be configured to associate the inclusion of particular device state list items in the summary list of device states. In this example, the person-of-interest context includes detection by the context engine of the presence of "Courtney" in the home. The patio meta-device state list item 505 indicates to the user that Courtney arrived home approximately 10 minutes ago. The people device type state list item 530 indicates that Courtney is still at home, and the outlets device type state list item indicates that she immediately turned on the television 525 upon arriving home. Various other device type state list items 510, 515, 520 and system state list items 535 may be included. In some embodiments, this context configuration is specific to the user and/or the device where the context configuration is persistently stored by the data engine 230.

Figure 6:
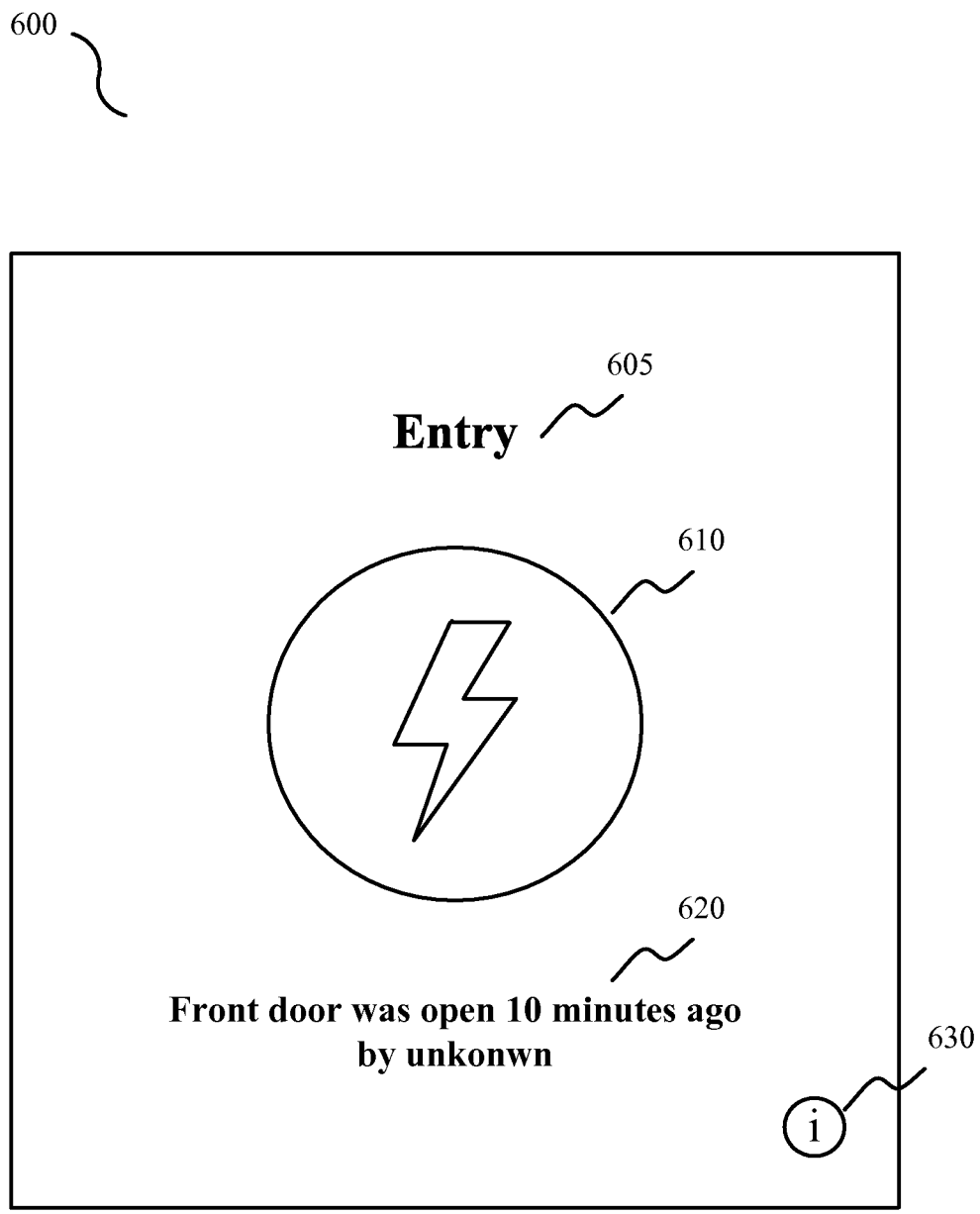
FIG. 6 is a block diagram of an exemplary user interface for a meta-device view displayed on a remote management device of FIG. 1.

Referring now to FIG. 6, an exemplary user interface for displaying a non-interactive view of a meta-device 600 may be generated by the view engine 240. The non-interactive view may include a device designator 605, a graphic symbol or icon 610, and device state data such as, for example, the type and time of the last event detected 620 by one or more sensors 125, feature controllers 126, and/or systems. In some embodiments, a user interface control such as, for example, an information icon initiates a transition to an interactive view of the meta-device. In some of these embodiments, the transition is a visual simulation of a card flip, with the interactive view of the meta-device appearing on the "back" of a meta-device card.

Figure 7:
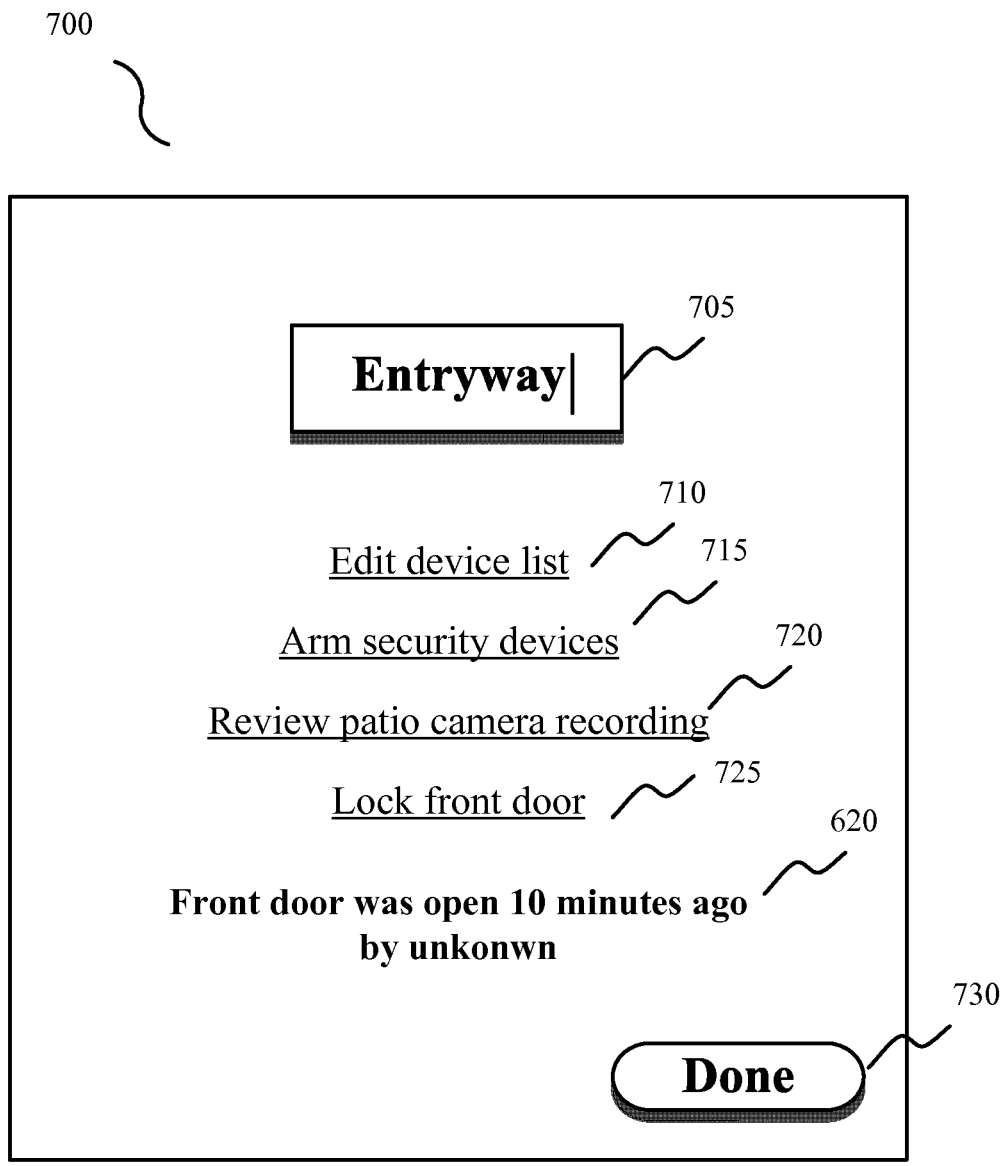
FIG. 7 is a block diagram of an exemplary user interface for a second meta-device view of the meta-device of FIG. 6.

Referring now to FIG. 7, an exemplary user interface for displaying an interactive view of a meta-device 700 may be generated by the view engine 240. In some instances, the interactive view may include an editable device designator 705, access to an editable device list of devices 710 associated with the meta-device, access to functions associated with the devices included in the device list 715, 720, 730, and device state data such as, for example, the type and time of the last event detected 620 by one or more sensors 125, feature controllers 126, and/or systems. In certain instances, the meta-device may correspond to a discreet physical location associated with the property, such as, for example, an entryway 705. In addition, other meta-devices may be associated with the meta-device when other meta-devices are included in the editable device list. The interactive view may also include a button 730 causing the interactive view to transition back to the non-interactive view. In some of these embodiments, the interactive view is modal.

Figure 8:
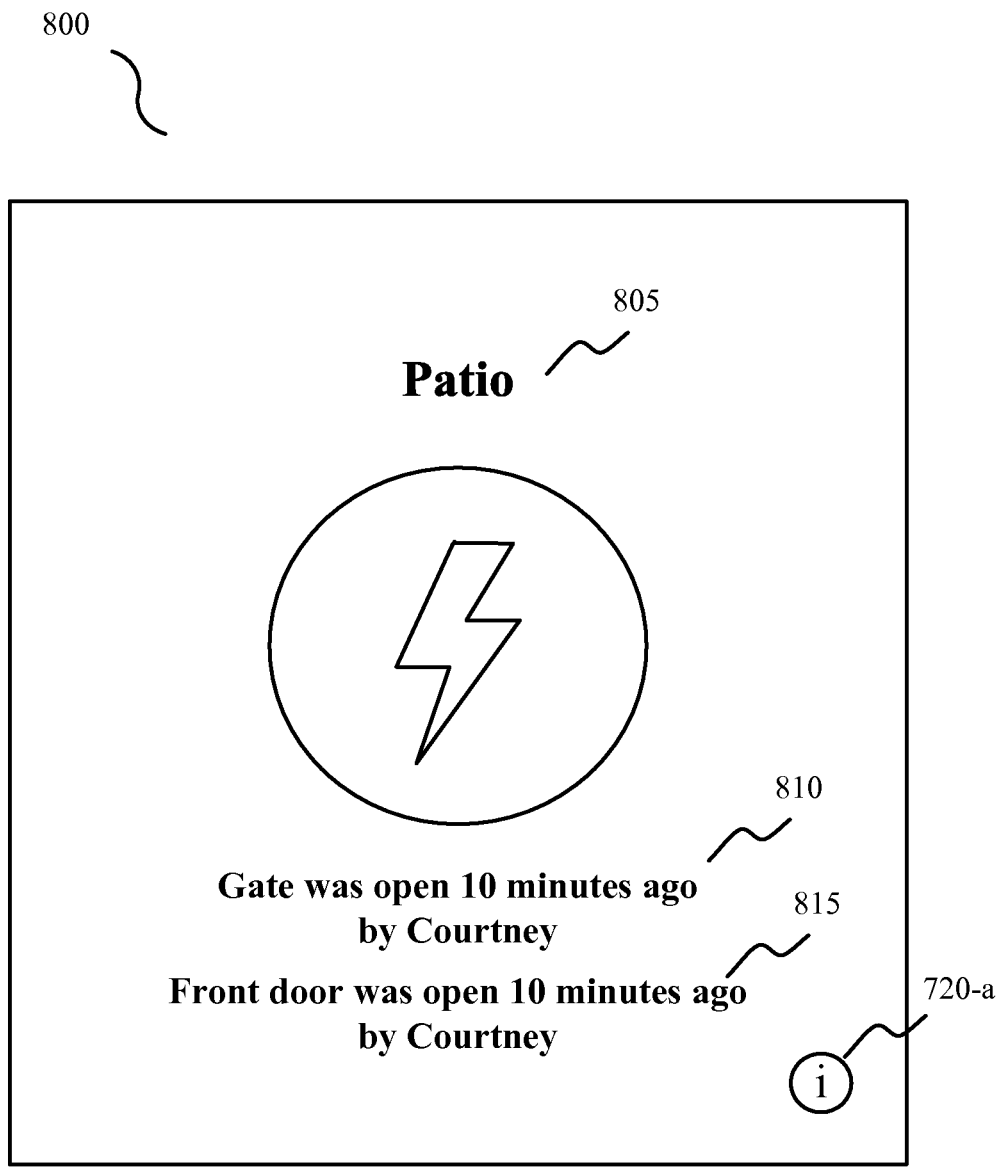
FIG. 8 is a block diagram of an exemplary user interface for a meta-device view incorporating devices associated with different property features displayed on a remote management device of FIG. 1.

Referring now to FIG. 8, an exemplary user interface for displaying an interactive view of another meta-device 800 may be generated by the view engine 240. In certain instances, the meta-device may correspond to an area associated with the property, such as a patio. A non-interactive patio meta-device view 800 may include a device designator 805 and multiple device status indications from multiple devices associated with the different property features. A patio meta-device may be associated with sensors 125 monitoring multiple entry points to the patio area including, for example, a front door monitoring device and a gate monitoring device. Gate device state data 810 and front door state data 815 may be simultaneously displayed in the non-interactive patio meta-device view 800.

Figure 9:
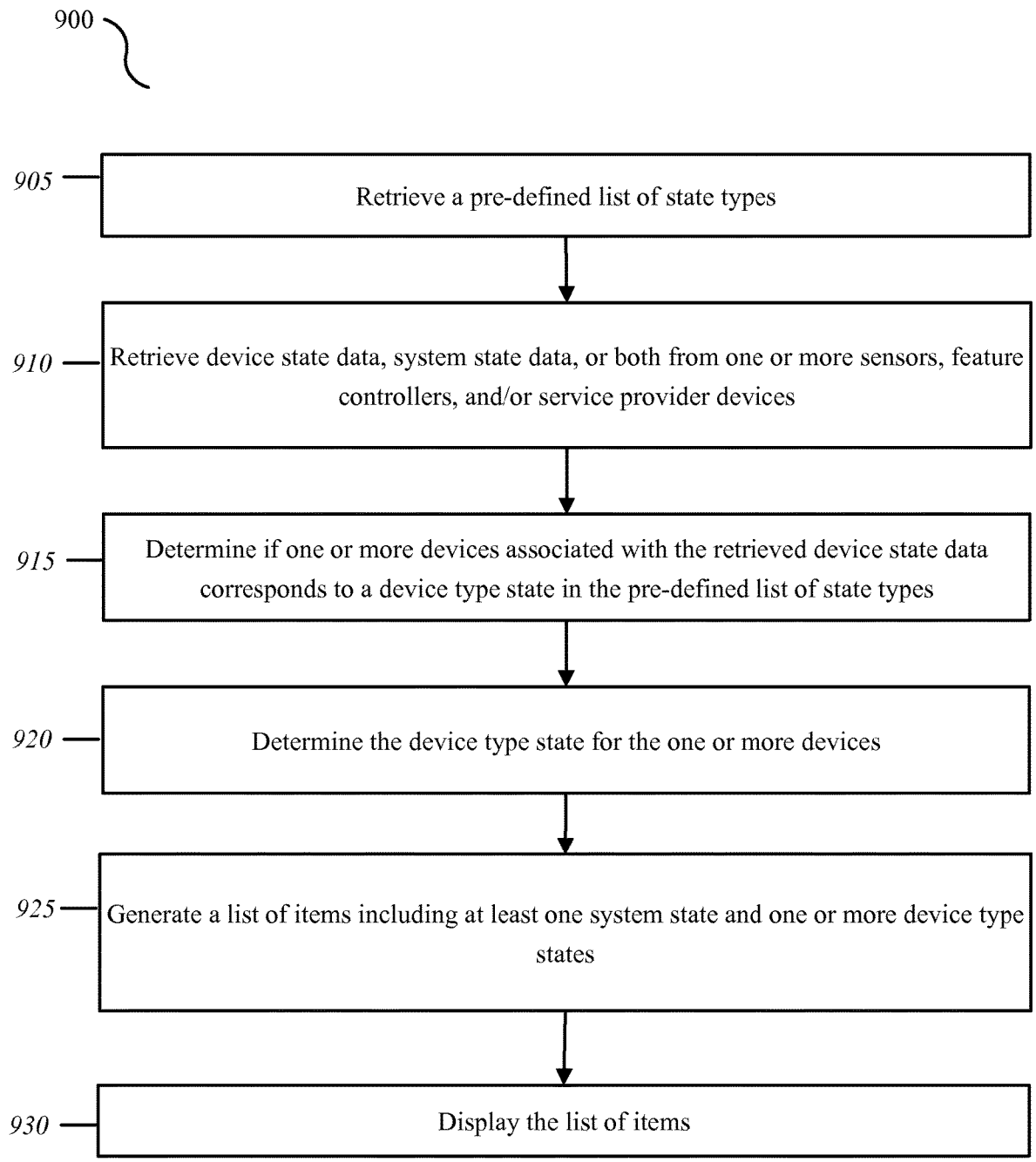
FIG. 9 is a flow diagram illustrating a method for displaying a list of items including a device type state according to various embodiments.

Referring now to FIG. 9, a general method 900 of using various embodiments of the systems and/or devices described herein is shown in accordance with various embodiments. For example, method 900 may be implemented utilizing the various embodiments of system 100, remote management device 105, application 140, application 140-a, home automation controller 155, computing device 150, sensor 125, feature controller 126, and/or other devices and/or components. At block 905, a pre-defined list of state types is retrieved from memory. In some embodiments, list retrieval is performed by data engine 230. Memory may be a local integrated device memory, external connected memory, and/or a memory coupled to another computer device.

At block 910, device state data, system state data, or both, may be retrieved from one or more sensors 125, feature controllers 126, and/or service provider devices 110. In some embodiments, the data engine 230 may request that the communication engine retrieve device state data directly from sensors 125, feature controllers 126, and/or service provider devices 110 and return the device state data to the parsing engine 220 for processing. In another embodiment, the communication engine may retrieve data from another computing device, such as home automation controller 155.

At block 915, retrieved state data is parsed by the parsing engine 220. The device types extracted from the parsed state data are compared against each device type state to determine if any retrieved device type data corresponds to a device included in the list of device type states.

At block 920, if the determining step of block 915 identifies one or more devices type states corresponding to one or more device types included in the retrieved list of state types, the identified one or more device type states are evaluated to determine if all identified device type states are identical.

At block 925, in some instances, if the identified device type states are identical, the application 140 may generate device type state information for inclusion in a list of device states, along with at least one system state. The parsing engine 220 may pass the list of device states to the view engine 240 to populate the list elements of a presentation view. At block 930, the application 140-a may display the list of device states in the view generated by the view engine 240.

Figure 10:
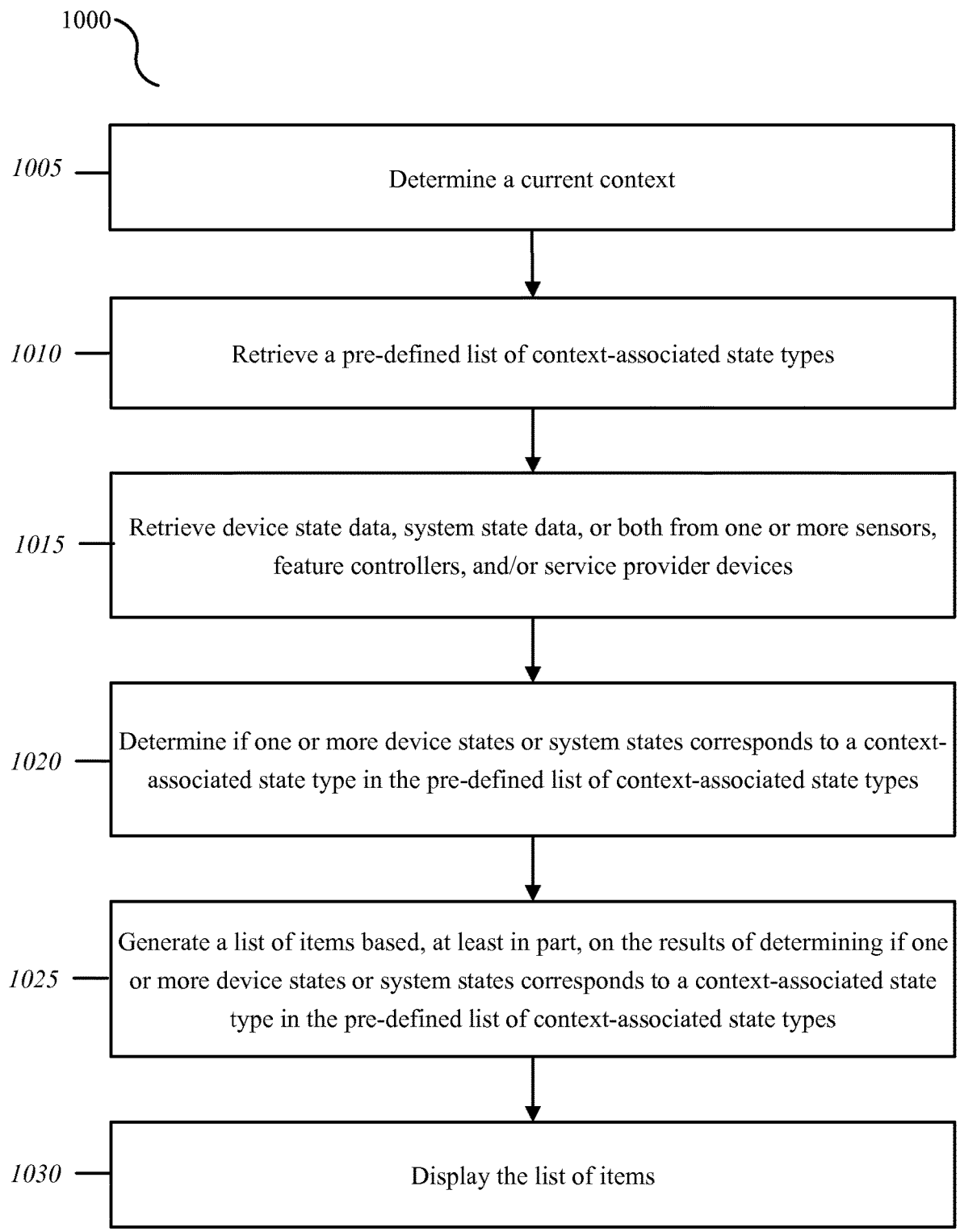
FIG. 10 is a flow diagram illustrating a method for displaying a context-associated list of items according to various embodiments.

With reference to FIG. 10, a general method 1000 of using various embodiments of the systems and/or devices described herein is shown in accordance with various embodiments. For example, method 1000 may be implemented utilizing the various embodiments of system 100, remote management device 105, application 140, application 140-a, home automation controller 155, computing device 150, sensor 125, feature controller 126, and/or other devices and/or components.

At block 1005, in some embodiments, context engine 235 may determine a current context. Contexts may include, for example, an application context, user context, or both. In some embodiments, application contexts may include, for example, a default context, a scene context, a person-of-interest context, and/or a functional context. In some embodiments, user contexts may include, for example, a location context such as at home and away from home.

At block 1010, one or more pre-defined lists of context-associated state types are retrieved from memory based, at least in part, on the result of the determining step of block 1005. In some embodiments, list retrieval is performed by data engine 230. Memory may be a local integrated device memory, external connected memory, and/or a memory coupled to another computer device. The retrieved meta-device configuration may be specific to a device, specific to a user, or both.

At block 1015, device state data, system state data, or both, may be retrieved from one or more sensors 125, feature controllers 126, and/or service provider devices 110. In some embodiments, the data engine 230 may request that the communication engine retrieve device state data directly from sensors 125, feature controllers 126, and/or service provider devices 110 and return the device state data to the parsing engine 220 for processing. In another embodiment, the communication engine may retrieve data from another computing device, such as home automation controller 155.

At block 1020, the device states extracted from the parsed state data by the parsing engine 220 are compared against each context-associated state type to determine if any retrieved device state corresponds to a state type included in the list of context associated state types.

At block 1025, in some instances, if the results of the determining step of block 1020 indicates that one or more retrieved device state types corresponds to a state type included in the list of context-associated state types, the application 140 may generate device type state information for inclusion in a list of device states. In some embodiments list generation will be based, at least in part, on the results of the determining step of block 1020. The parsing engine 220 may pass the list of items to the view engine 240 to populate the list elements of a presentation view. At block 930-b, the application 140-a may display the list of items in the view generated by the view engine 240.

Figure 11:
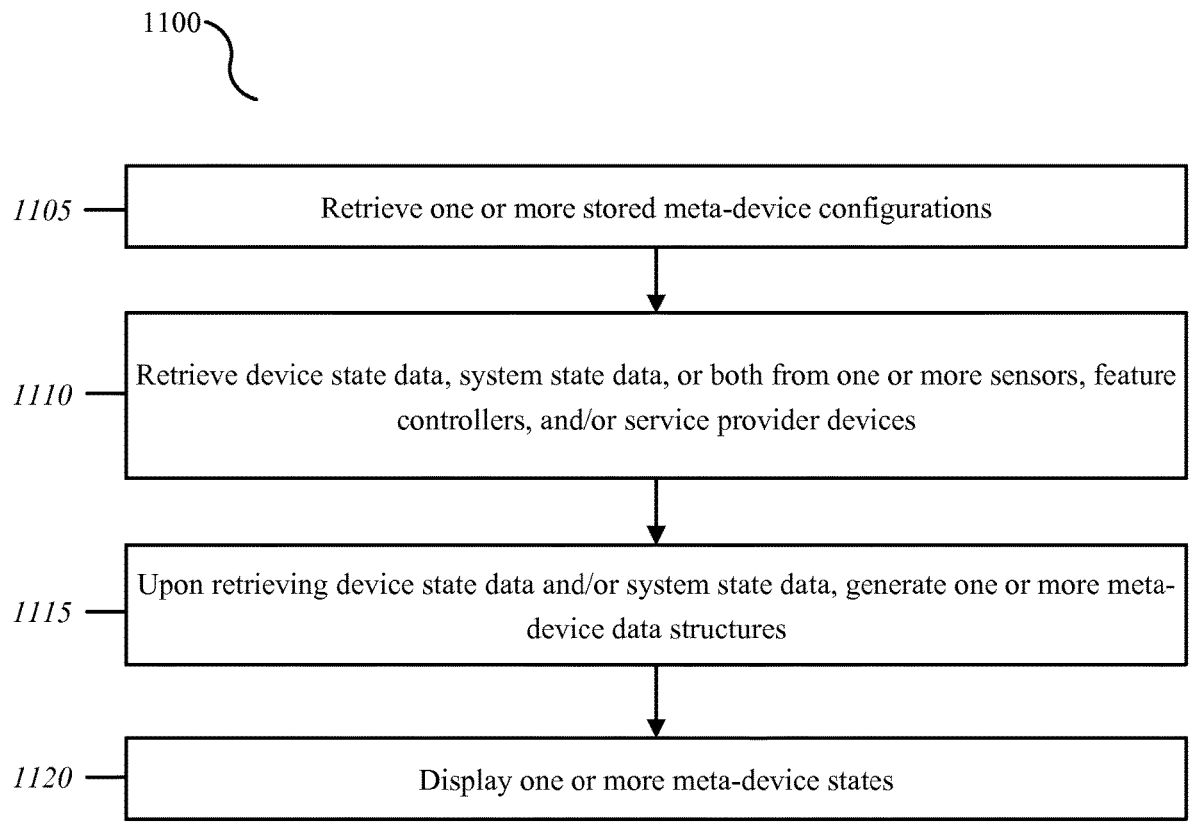
FIG. 11 is a flow diagram illustrating a method for displaying a meta-device state according to various embodiments.

With reference to FIG. 11, a general method 1100 of using various embodiments of the systems and/or devices described herein is shown in accordance with various embodiments. For example, method 1100 may be implemented utilizing the various embodiments of system 100, remote management device 105, application 140, application 140-a, home automation controller 155, computing device 150, sensor 125, feature controller 126, and/or other devices and/or components.

At block 1105, one or more meta-device configurations are retrieved from memory. In some embodiments, configuration retrieval is performed by data engine 230. Memory may be a local integrated device memory, external connected memory, and/or a memory coupled to another computer device. The retrieved meta-device configuration may be specific to a device, specific to a user, or both.

At block 1110, device state data, system state data, or both, may be retrieved from one or more sensors 125, feature controllers 126, and/or service provider devices 110. In some embodiments, the data engine 230 may request that the communication engine 225 retrieve device state data directly from sensors 125, feature controllers 126, and/or service provider devices 110 and return the device state data to the parsing engine 220 for processing. In another embodiment, the communication engine 225 may retrieve data from another computing device, such as home automation controller 155.

At block 1115, parsing engine 220 parses retrieved data and generates meta-device data structures, such as by instantiating meta-data device objects. The parsing engine 220 may compare retrieved device state data with retrieved meta-device configurations to identify meta-device data structures for creation. The device types extracted from the parsed state data are compared against each device type state to determine if any retrieved device type data corresponds to a device included in the list of device type states. At block 1120, the application 140-*a* may display the list of items in the view generated by the view engine 240.

Figure 12:
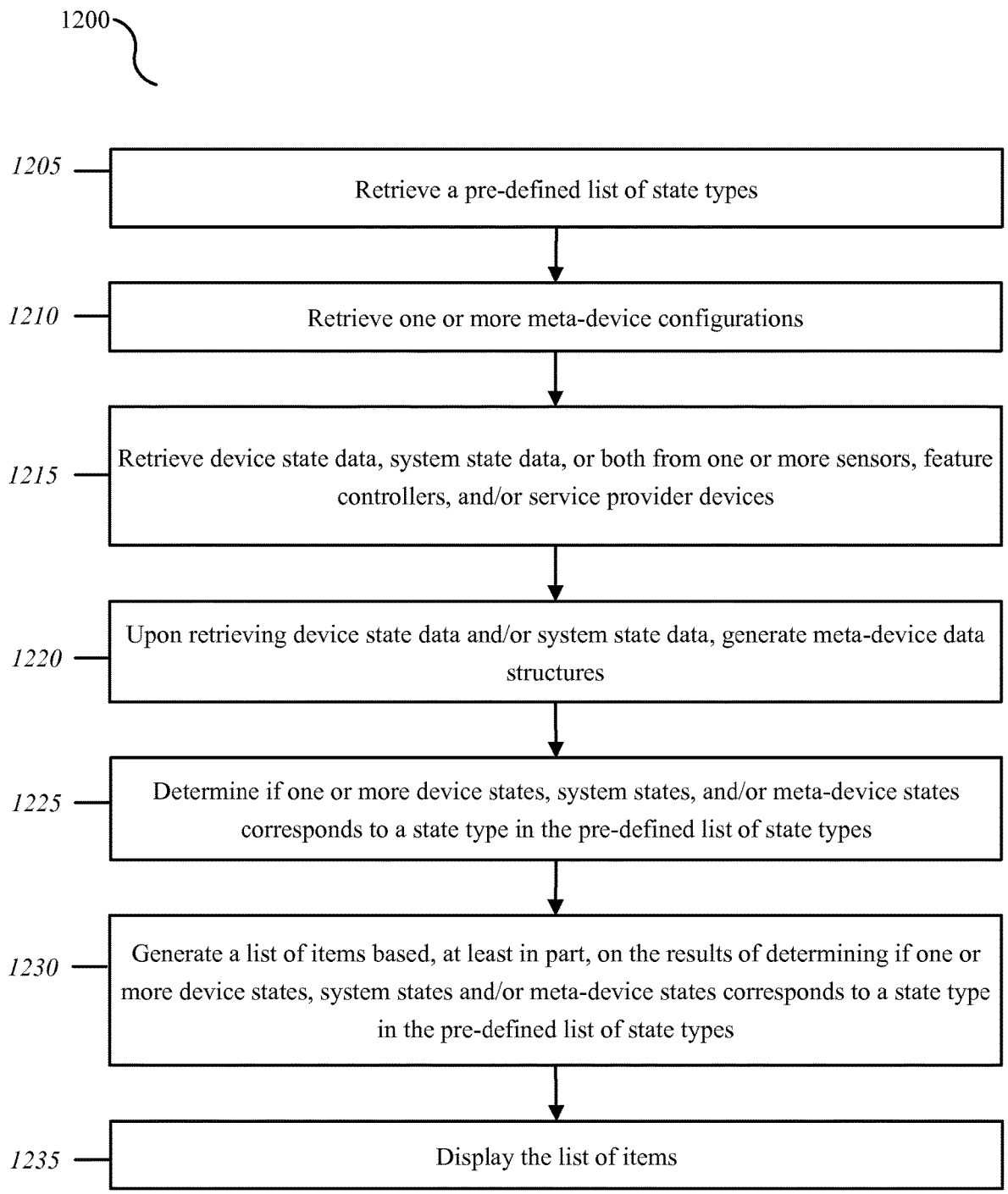
FIG. 12 is a flow diagram illustrating a method for displaying a meta-device state in a list of items according to an embodiment of FIG. 11.

With reference to FIG. 12, a general method 1200 of using various embodiments of the systems and/or devices described herein is shown in accordance with various embodiments. General method 1200 is an embodiment of general method 1100. For example, method 1200 may be implemented utilizing the various embodiments of system 100, remote management device 105, application 140, application 140-*a*, home automation controller 155, computing device 150, sensor 125, feature controller 126, and/or other devices and/or components. At block 1205, a pre-defined list of state types is retrieved from memory. In some embodiments, list retrieval is performed by data engine 230. Memory may be a local integrated device memory, external connected memory, and/or a memory coupled to another computer device.

At block 1210, one or more meta-device configurations are retrieved from memory. In some embodiments, configuration retrieval is performed by data engine 230. Memory may be a local integrated device memory, external connected memory, and/or a memory coupled to another computer device. The retrieved meta-device configuration may be specific to a device, specific to a user, or both.

At block 1215, device state data, system state data, or both, may be retrieved from one or more sensors 125, feature controllers 126, and/or service provider devices 110. In some embodiments, the data engine 230 may request that the communication engine 225 retrieve device state data directly from sensors 125, feature controllers 126, and/or service provider devices 110 and return the device state data to the parsing engine 220 for processing. In another embodiment, the communication engine 225 may retrieve data from another computing device, such as home automation controller 155.

At block 1220, parsing engine 220 parses retrieved data and generates meta-device data structures, such as by instantiating meta-data device objects. The parsing engine 220 may compare retrieved device state data with retrieved meta-device configurations to identify meta-device data structures for creation. The device types extracted from the parsed state data are compared against each device type state to determine if any retrieved device type data corresponds to a device included in the list of device type states.

At block 1225, the device types extracted from the parsed state data and the meta device data structures created by the parsing engine 220 are compared against each device type state to determine if any retrieved device type state or constructed meta-device data structures corresponds to a device included in the list of device type states.

At block 1230, in some instances, if the results of the determining step of block 1225 indicates that one or more retrieved device type states or constructed meta-device data structures corresponds to a device included in the list of device type states, the application 140 will generate device type state information for inclusion in a list of items, along with at least one system state. List generation may be based, at least in part, on the results of the determining step of block 1230. The parsing engine 220 may pass the list of items to the view engine 240 to populate the list elements of a presentation view. At block 1235, the application 140 may display the list of items in the view generated by the view engine 240.

Figure 13:
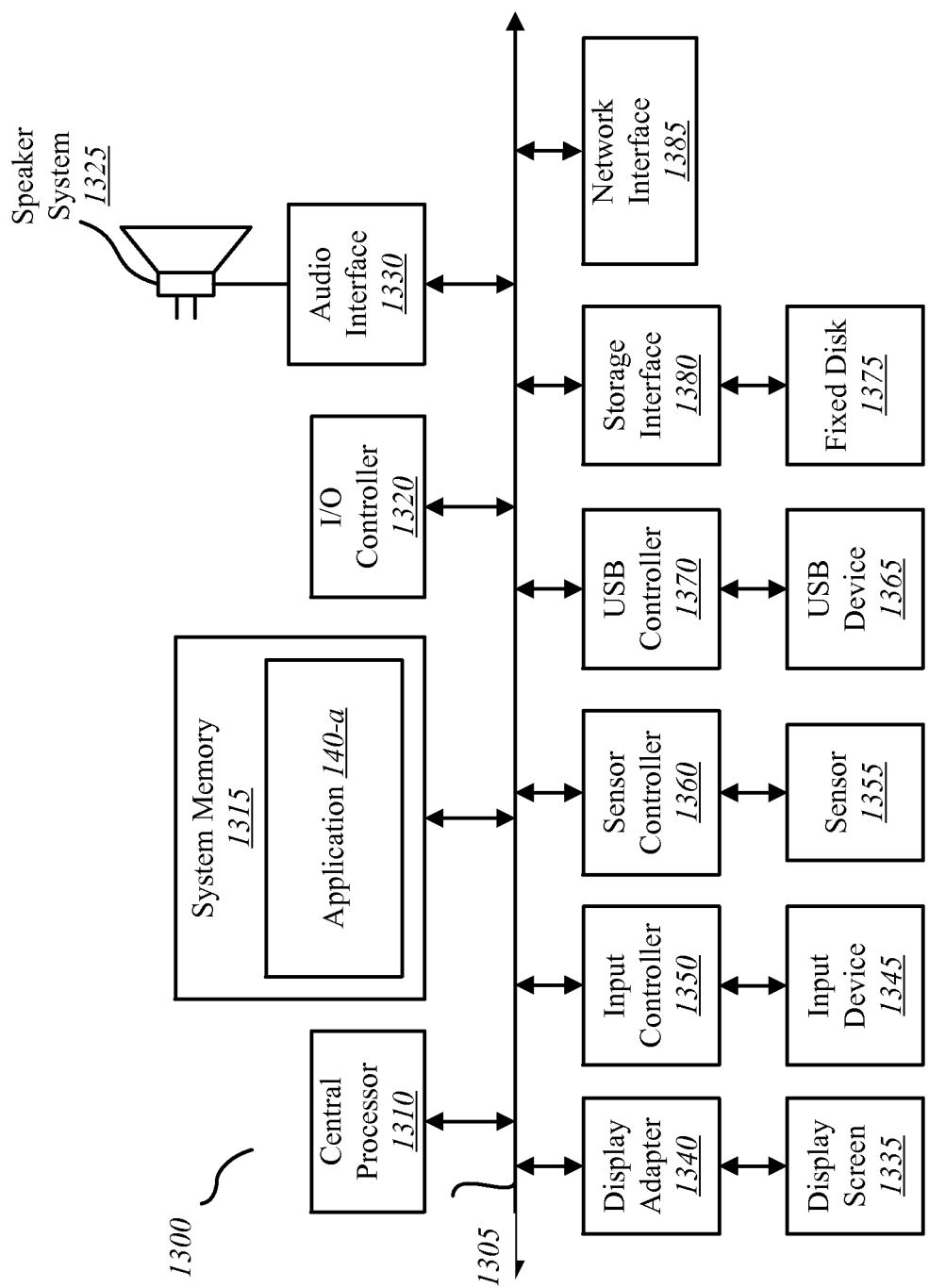
FIG. 13 is a block diagram of a computer system suitable for implementing the present systems and methods of FIG. 1.

FIG. 13 depicts a block diagram of a controller 1300 suitable for implementing the present systems and methods. The controller 1300 may be an example of remote management device 105, computing device 150, and/or home automation controller 155 illustrated in FIG. 1. In one configuration, controller 1300 includes a bus 1305 which interconnects major subsystems of controller 1300, such as a central processor 1315, a system memory 1320 (typically RAM, but which may also include ROM, flash RAM, or the like), an input/output controller 1325, an external audio device, such as a speaker system 1330 via an audio output interface 1335, an external device, such as a display screen 1335 via display adapter 1340, an input device 1345 (e.g., remote control device interfaced with an input controller 1350), multiple USB devices 1365 (interfaced with a USB controller 1370), and a storage interface 1380. Also included are at least one sensor 1355 connected to bus 1305 through a sensor controller 1360 and a network interface 1385 (coupled directly to bus 1305).

Bus 1305 allows data communication between central processor 1315 and system memory 1320, which may include read-only memory (ROM) or flash memory, and random access memory (RAM), as previously noted. The RAM is generally the main memory into which the operating system and application programs are loaded. The ROM or flash memory may contain, among other code, the Basic Input-Output system (BIOS) which controls basic hardware operation such as the interaction with peripheral components or devices. Applications (e.g., application 140) resident with controller 1300 are generally stored on and accessed via a non-transitory computer readable medium, such as a hard disk drive (e.g., fixed disk 1375) or other storage medium. Additionally, applications may be in the form of electronic signals modulated in accordance with the application and data communication technology when accessed via interface 1385.

Storage interface 1380, as with the other storage interfaces of controller 1300, may connect to a standard computer readable medium for storage and/or retrieval of information, such as a fixed disk drive 1375. Fixed disk drive 1375 may be a part of controller 1300 or may be separate and accessed through other interface systems. Network interface 1385 may provide a direct connection to a remote server via a direct network link to the Internet via a POP (point of presence). Network interface 1385 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1300 wirelessly via network interface 1385.

Many other devices or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 13 need not be present to practice the present systems and methods. In some embodiments the devices and subsystems may be interconnected in different ways from that shown in FIG. 13. For some embodiments an aspect of some operations of a system such as that shown in FIG. 13 are readily known in the art and are not discussed in detail in this application. Computer instructions to implement the present disclosure may be stored in a non-transitory computer-readable medium such as one or more of system memory 1320 or fixed disk 1375. The operating system provided on controller 1300 may be, for example, iOS®, ANDROID®, MS-DOS®, MS-WINDOWS®, OS/2®, UNIX®, LINUX®, OSX®, or another known operating system.

In some embodiments, a Model-View-Controller design pattern implements the interactive behavioral treatment delivery system, assigning objects in the system to one of three roles: model, view, or controller. The pattern defines not only the roles objects play in the application, but it also defines the way objects communicate with each other Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. In some embodiments to some extent, a signal input at a second block may be conceptualized as a second signal derived from a first signal output from a first block due to physical limitations of the circuitry involved (e.g., there will inevitably be some attenuation and delay). Therefore, In some embodiments as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A home automation control device, comprising:
a display;
memory associated with the display;
one or more processors configured to execute one or more programs stored in the memory; and
a graphical user interface produced by an application program operating on the home automation control device, the graphical user interface comprising:
a list of items, the list of items generated based at least in part on a determination whether a first user is located a threshold distance away from a property associated with the home automation control device, wherein the determination is based at least in part on a comparison between a first location coordinate of the first user associated with the home automation control device and a second location coordinate of the property associated with the home automation control device, wherein a first item, a second item, and a third item are determined for display based at least in part on the first location coordinate of the first user and a presence of a second user, wherein the second user is associated with a user account of the home automation control device, and wherein the first item indicates the presence of the second user at the property and an interaction between the second user and a window within the property and is displayed in the list of items based at least in part on the first user being located the threshold distance away from the property and a context configuration associated with the first user, the second item different from the first item and the third item is displayed in the list of items based at least in part on the first user being located within the threshold distance from the property, and the third item indicates detected activity from the second user at a patio of the property associated with a gate of the patio and motion detected on the patio and is displayed in the list of items based at least in part on the first user being located the threshold distance away from the property and the context configuration associated with the first user, the list of items comprising a plurality of displayed items associated with device states, wherein:
 at least one displayed item is associated with a property automation device state;
 at least one displayed item is associated with a security device state; and
 at least one displayed item comprises a non-warning status.

2. The graphical user interface of claim 1, further comprising at least one displayed item associated with an energy monitoring device state.

3. The graphical user interface of claim 1, wherein inclusion of one or more items in the list of items is based, at least in part, on a current application context.

4. The graphical user interface of claim 1, wherein the list of items is based, at least in part, on a configurable list of context-associated state types.

5. The graphical user interface of claim 1, wherein at least one displayed item comprises a device type status.

6. The graphical user interface of claim 1, wherein at least one displayed item comprises a most recent device event.

7. The graphical user interface of claim 1, wherein at least one displayed item comprises a current device state.

8. The graphical user interface of claim 7, wherein at least one current device state comprises a meta-device state.

9. The graphical user interface of claim 7, wherein the displayed item is interactive.

10. The graphical user interface of claim 1, wherein the home automation control device is a portable electronic device with a touch screen display.

11. The graphical user interface of claim 1, wherein at least one displayed item comprises an indication of a presence of a person at the property associated with the home automation control device.

12. The graphical user interface of claim 1, wherein the context configuration associated with the first user identifies the first item for display at the graphical user interface.

13. A home automation control device, comprising:
 a display;
 memory associated with the display;
 one or more processors configured to execute one or more programs stored in the memory; and
 a graphical user interface produced by an application program operating on the home automation control device, the graphical user interface comprising, a device view, wherein a first item, a second item, and a third item are determined for display based at least in part on a first location coordinate of a first user and a presence of a second user, wherein the second user is associated with a user account of the home automation control device, and wherein the first item indicates the presence of the second user at a property associated with the home automation control device and an interaction between the second user and a window within the property and is displayed in the device view based at least in part on the first user being located a threshold distance away from the property and a context configuration associated with the first user, the second item different from the first item and the third item is displayed in the device view based at least in part on the first user being located within the threshold distance from the property, and the third item indicates detected activity from the second user at a patio of the property associated with a gate of the patio and motion detected on the patio and is displayed in the device view based at least in part on the first user being located the threshold distance away from the property and the context configuration associated with the first user, the device view comprising:
  a device identifier, the device identifier comprising a physical location;
  a plurality of device states associated with the physical location, the plurality of device states including a first type of a first prior event detected by a first sensor located at the physical location and a second type of a second prior event detected by a second sensor located at the physical location; and
  a plurality of sensor statuses, wherein:
   the plurality of sensor statuses includes a first sensor status associated with the first sensor; and
   a second sensor status associated with the second sensor.

14. The graphical user interface of claim 13, wherein the device identifier is a physical area associated with the property.

15. The graphical user interface of claim 13, wherein the device identifier is associated with a first property feature.

16. The graphical user interface of claim 15, wherein the second sensor is associated with a second property feature.

17. The graphical user interface of claim 13, wherein the home automation control device is a portable electronic device with a touch screen display.

18. A home automation control device, comprising:
 a display;
 memory associated with the display;
 one or more processors configured to execute one or more programs stored in the memory; and
 a graphical user interface produced by an application program operating on the home automation control device, the graphical user interface comprising:
  a device interface, wherein a first device identifier, a second device identifier, and a third device identifier are determined for display based at least in part on a first location coordinate of a first user and a presence of a second user, wherein the second user is associated with a user account of the home automation control device, and wherein the first device identifier indicates the presence of the second user at a property associated with the home automation control device and an interaction between the second user and a window within the property and is displayed in the device interface based at least in part on the first user being located a threshold distance away from the property and a context configuration associated with the first user, the second device identifier different from the first device identifier and the third device identifier is displayed in the device interface based at least in part on the first user being located within the threshold distance from the property, and the third device identifier indicates detected activity from the second user at a patio of the property associated with a gate of the patio and motion detected on the patio and is displayed in the device interface based at least in part on the first user being located the threshold distance away from the property and the context configuration associated with the first user, the device interface comprising a plurality of associated device views, wherein:
   a first device view comprises at least one non-interactive display of a device identifier, the first device view associated with a physical location;

a second device view comprises at least one interactive display of the device identifier, a first sensor status associated with a first sensor located at the physical location, and a second sensor status associated with a second sensor located at the physical location;

the first device view comprises a first toggle control which when selected causes a first transition to the second device view; and the second device view comprises a second toggle control which when selected causes a second transition to the first device view.

19. The graphical user interface of claim 18, wherein the first device view and the second device view are associated with a meta-device.

20. The graphical user interface of claim 18, wherein the second device view are associated with the physical location.

21. The graphical user interface of claim 18, wherein the home automation control device is a portable electronic device with a touch screen display.

\* \* \* \* \*